(12) United States Patent
Hu et al.

(10) Patent No.: US 11,436,430 B2
(45) Date of Patent: Sep. 6, 2022

(54) FEATURE INFORMATION EXTRACTION METHOD, APPARATUS, SERVER CLUSTER, AND STORAGE MEDIUM

(71) Applicant: Tencent Technology (Shenzhen) Company Limited, Guangdong (CN)

(72) Inventors: Baotian Hu, Guangdong (CN); Qian Chen, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 756 days.

(21) Appl. No.: 16/439,089

(22) Filed: Jun. 12, 2019

(65) Prior Publication Data

US 2019/0303709 A1     Oct. 3, 2019

Related U.S. Application Data

(63) Continuation of application No. PCT/CN2018/074795, filed on Jan. 31, 2018.

(30) Foreign Application Priority Data

Feb. 13, 2017 (CN) .......................... 201710076121.8

(51) Int. Cl.
*G06K 9/62* (2022.01)
*G06F 17/16* (2006.01)
(Continued)

(52) U.S. Cl.
CPC .............. *G06K 9/623* (2013.01); *G06F 16/00* (2019.01); *G06F 17/16* (2013.01); *G06K 9/62* (2013.01);
(Continued)

(58) Field of Classification Search
CPC .......... G06K 9/623; G06K 9/62; G06F 16/00; G06F 17/16; G06N 3/04; G06N 3/0454;
(Continued)

(56) References Cited

U.S. PATENT DOCUMENTS 9,981,189 B1 * 5/2018 Wakeford ............. A63F 13/837
2002/0038244 A1   3/2002 Amano et al.
(Continued)

FOREIGN PATENT DOCUMENTS

CN          1387148 A    12/2002
CN        101957859 A     1/2011
(Continued)

OTHER PUBLICATIONS

International Search Report and Written Opinion dated May 8, 2018 for PCT Application No. PCT/CN2018/074795, 16 pages.
(Continued)

*Primary Examiner* — Fayyaz Alam
(74) *Attorney, Agent, or Firm* — Crowell & Moring LLP

(57) ABSTRACT

This application relates to a feature information extraction method and apparatus, a server cluster, and a storage medium. In various implementations, package attribute vectors respectively corresponding to at least two virtual item packages of a target object may be obtained. Feature extraction may be performed on these package attribute vectors to obtain feature vectors. Using the feature vector feature information may be obtained for the virtual item packages. In this way, differences between users of different attributes when the users are using virtual item packages may be considered, thereby improving the accuracy, efficiency and security of feature information extraction.

20 Claims, 5 Drawing Sheets

(51) Int. Cl.
*G06N 3/04* (2006.01)
*G06N 3/08* (2006.01)
*G06N 99/00* (2019.01)
*G06F 16/00* (2019.01)
*H04L 65/40* (2022.01)

(52) U.S. Cl.
CPC ............... *G06N 3/04* (2013.01); *G06N 3/049* (2013.01); *G06N 3/0454* (2013.01); *G06N 3/08* (2013.01); *G06N 99/00* (2013.01); *H04L 65/40* (2013.01)

(58) Field of Classification Search
CPC .......... G06N 3/049; G06N 3/08; G06N 99/00; H04L 65/40
See application file for complete search history.

(56) References Cited

U.S. PATENT DOCUMENTS

2009/0018984 A1   1/2009   Solinsky
2016/0234302 A1*  8/2016   Wu ................... G06Q 20/386

FOREIGN PATENT DOCUMENTS

| | | |
|---|---|---|
| CN | 104462241 A | 3/2015 |
| CN | 105701498 | 6/2016 |
| CN | 106056444 A | 10/2016 |
| CN | 106126578 A | 11/2016 |
| CN | 106204106 A | 12/2016 |
| KR | 2002-0089117 A | 11/2002 |
| WO | WO2017202006 | 11/2017 |

OTHER PUBLICATIONS

Office Action dated Feb. 3, 2020 for Chinese Application No. 201710076121.8 with concise English Translation, 9 pages.

International Search Report for PCT/CN2018/074795 dated May 8, 2018.

Written Opinion of the International Searching Authority for PCT/CN2018/074795 dated May 8, 2018.

* cited by examiner

FEATURE INFORMATION EXTRACTION METHOD, APPARATUS, SERVER CLUSTER, AND STORAGE MEDIUM

RELATED APPLICATION

This application is a continuation of and claims priority to PCT International Application No. PCT/CN2018/074795 filed on Jan. 31, 2018, titled METHOD AND DEVICE FOR EXTRACTING FEATURE INFORMATION, SERVER CLUSTER, AND STORAGE MEDIUM, which claims priority to Chinese Patent Application No. 201710076121.8, filed with the China National Intellectual Property Administration on Feb. 13, 2017 and entitled "METHOD AND APPARATUS FOR EXTRACTING FEATURE INFORMATION OF TARGET OBJECT", wherein each of the aforementioned applications are incorporated herein by reference in their entirety.

FIELD OF THE TECHNOLOGY

This application relates to the field of network application technologies, and in particular, to a feature information extraction method, apparatus, server cluster, and storage medium.

BACKGROUND OF THE DISCLOSURE

With the development of network application technologies, more users use virtual item packages in social network applications to give or receive resources such as currency, points, equipment in online games, and virtual pets.

As users use virtual item packages more frequently, the use of virtual item packages is becoming more important in user's network behaviors. Correspondingly, by extracting feature information of behaviors of a single user or a group of users using virtual item packages, the single user or the group is analyzed, for example, the user or the group is classified, and network service providers are paying more attention.

In the related technology, when a server of a network service provider extracts feature information of behaviors of a single user or a group of users using virtual item packages, a quantity of the virtual item packages corresponding to the user or the group, a total quantity of resources, an average quantity of resources, a variance of a quantity of resources, and the like are generally counted. Then the server determines abnormal attribute information according to the attribute information of the foregoing attributes as the feature information of the corresponding user or group.

SUMMARY

Embodiments of the present disclosure provide a feature information extraction method, apparatus, server cluster, and storage medium.

In an implementation, a feature information extraction method is provided. The method may be applied to a server cluster. The method includes obtaining package attribute vectors respectively corresponding to at least two virtual item packages of a target object, and obtaining an object attribute vector of the target object, each element in the package attribute vectors indicating one attribute of a corresponding virtual item package, and each element in the object attribute vector indicating one attribute of the target object. The method may further include performing, by using a first machine learning model, feature extraction on the package attribute vectors respectively corresponding to the at least two virtual item packages, to obtain feature vectors respectively corresponding to the at least two virtual item packages. The method may further include performing, by using a second machine learning model, feature extraction on the feature vectors respectively corresponding to the at least two virtual item packages and the object attribute vector of the target object, to obtain importance fractions respectively corresponding to the at least two virtual item packages. The method may further include extracting feature information of the target object according to the feature vectors respectively corresponding to the at least two virtual item packages and the importance fractions respectively corresponding to the at least two virtual item packages.

In another implementation, a feature information extraction apparatus is provided. The apparatus may include include:

a first vector obtaining circuit, configured to obtain package attribute vectors respectively corresponding to at least two virtual item packages of a target object, each element in the package attribute vectors indicating one attribute of a corresponding virtual item package. The apparatus may further include a second vector obtaining circuit, configured to obtain an object attribute vector of the target object, each element in the object attribute vector indicating one attribute of the target object. The apparatus may further include a feature vector obtaining circuit, configured to perform, by using a first machine learning model, feature extraction on the package attribute vectors respectively corresponding to the at least two virtual item packages, to obtain feature vectors respectively corresponding to the at least two virtual item packages. The apparatus may further include a fraction obtaining circuit, configured to perform, by using a second machine learning model, feature extraction on the feature vectors respectively corresponding to the at least two virtual item packages and the object attribute vector of the target object, to obtain importance fractions respectively corresponding to the at least two virtual item packages. The apparatus may further include a feature extraction circuit, configured to extract feature information of the target object according to the feature vectors respectively corresponding to the at least two virtual item packages and the importance fractions respectively corresponding to the at least two virtual item packages.

In yet another implementation, a server cluster is provided. The server cluster may include a processor, a central processing unit, and memory. the memory may one or more programs. The processor executing the one or more programs to perform one or more actions. In some cases, the actions may include obtaining package attribute vectors respectively corresponding to at least two virtual item packages of a target object, and obtaining an object attribute vector of the target object, each element in the package attribute vectors indicating one attribute of a corresponding virtual item package, and each element in the object attribute vector indicating one attribute of the target object. In some cases, the actions may further include performing, by using a first machine learning model, feature extraction on the package attribute vectors respectively corresponding to the at least two virtual item packages, to obtain feature vectors respectively corresponding to the at least two virtual item packages. In some cases, the actions may include performing, by using a second machine learning model, feature extraction on the feature vectors respectively corresponding to the at least two virtual item packages and the object attribute vector of the target object, to obtain importance fractions respectively corresponding to the at least two virtual item packages. In some cases, the actions may include extracting feature information of the target object according to the feature vectors respectively corresponding to the at least two virtual item packages and the importance fractions respectively corresponding to the at least two virtual item packages.

In another implementation, a non-transitory computer readable storage medium is provided. The medium may store one or more instructions. When the instructions are executed by a processor, the instructions may cause the processor to perform one or more actions. In some cases, the actions may include obtaining package attribute vectors respectively corresponding to at least two virtual item packages of a target object, and obtaining an object attribute vector of the target object, each element in the package attribute vectors indicating one attribute of a corresponding virtual item package, and each element in the object attribute vector indicating one attribute of the target object. In some cases, the actions may include performing, by using a first machine learning model, feature extraction on the package attribute vectors respectively corresponding to the at least two virtual item packages, to obtain feature vectors respectively corresponding to the at least two virtual item packages. In some cases, the actions may include performing, by using a second machine learning model, feature extraction on the feature vectors respectively corresponding to the at least two virtual item packages and the object attribute vector of the target object, to obtain importance fractions respectively corresponding to the at least two virtual item packages. In some cases, the actions may include extracting feature information of the target object according to the feature vectors respectively corresponding to the at least two virtual item packages and the importance fractions respectively corresponding to the at least two virtual item packages.

The technical solutions provided in the embodiments of the present disclosure may, in some cases, include the following beneficial effects:

When feature information of a user or a group is extracted, with reference to an attribute of the user or the group, feature extraction is performed on feature vectors of virtual item packages used by the user or the group. This may be used to obtain importance fractions respectively corresponding to the virtual item packages used by the user or the group. In some cases, the feature information is extracted with reference to the importance fractions respectively corresponding to the virtual item packages. In this way, differences between users of different attributes when the users are using virtual item packages may be, in some cases, fully considered; and the problem in the related technology that only information about attributes of the virtual item packages is extracted, thereby improving the accuracy, efficiency, and security of the feature information extraction with reference to attributes of the user and attributes of the virtual item packages. In this way, the underlying hardware of the system is improved.

It should be understood that the foregoing general descriptions and the following detailed descriptions are examples and explanations, and are intended to form a portion of the present disclosure rather than necessarily characterizing the disclosure as a whole.

BRIEF DESCRIPTION OF THE DRAWINGS

The accompanying drawings herein are incorporated in and constitute a part of the specification, illustrate embodiments of the present disclosure, and are used to explain the principle of the present disclosure together with the specification.

DESCRIPTION OF EMBODIMENTS

Example embodiments are described in detail herein, and examples of the example embodiments are shown in the accompanying drawings. When the following descriptions relate to the accompanying drawings, unless indicated otherwise, same numbers in different accompanying drawings represent same or similar elements. Implementations described in the following example embodiments are not all implementations of the present disclosure. On the contrary, the implementations described herein are examples of the apparatus and method that are described in claims in detail and that are consistent with some implementations of the present disclosure.

Figure 1:
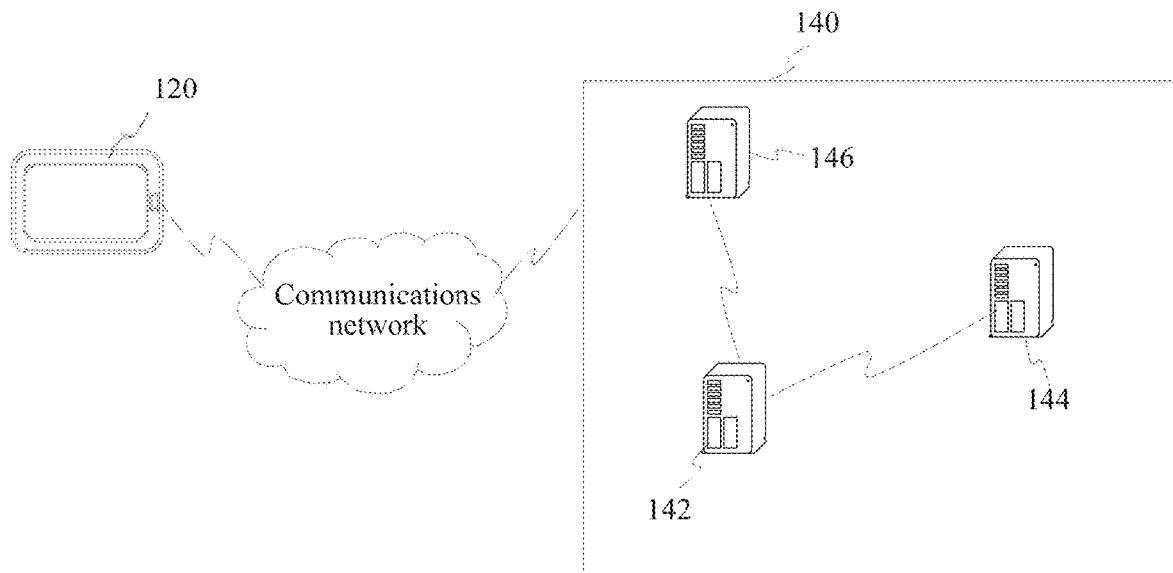
FIG. 1 is a schematic structural diagram of a feature information extraction system according to an example embodiment.

FIG. 1 is a schematic structural diagram of a feature information extraction system according to an example embodiment. The system includes several examples of user equipment 120 and a server cluster 140.

The user equipment 120 may be a mobile phone, a tablet computer, an e-book reader, a moving picture experts group audio layer III (MP3) player, a moving picture experts group audio layer IV (MP4) player, a laptop portable computer, a desktop computer, or the like.

The user equipment 120 is connected to the server cluster 140 through a communications network. Optionally, the communications network is a wired network or a wireless network.

The server cluster 140 is one server or several servers, a virtualization platform, or a cloud computing service center. Optionally, the server cluster 140 may include a feature information management platform 142. Optionally, the server cluster 140 further includes a social network platform 144. Optionally, the server cluster 140 further includes a user operation recording and management server 146.

Optionally, the feature information management platform 142 includes a server configured to perform feature information extraction and a server configured to implement a feature information-based application (for example, configured to classify users or groups).

Optionally, the social network platform 144 includes: a server configured to receive and send a virtual item package, a server configured to receive and send social information, a server configured to manage and store various user accounts, a server configured to manage and store various group accounts, and a server configured to manage contacts lists of various user accounts or contacts lists of group accounts. The social network platform 144 is connected to the user operation recording and management server 146 through a communications network.

Optionally, the user operation recording and management server 146 includes: a server configured to collect statistics on historical usage records of a user on a virtual item package and a server configured to store historical usage records of a user on a virtual item package.

Optionally, the user operation recording and management server 146 may obtain, with user authorization and from the local social network platform 144 or another associated social network application platform, recorded data of an operation performed by a user on a virtual item package, and collect statistics on historical usage records of the user on the virtual item package according to the obtained operation records.

Optionally, the system may further include a management device 160. The management device 160 is connected to the server cluster 140 through a communications network. Optionally, the communications network is a wired network or a wireless network.

Optionally, the wireless network or the wired network uses a standard communications technology and/or protocol. The network is usually the Internet, but may be any other network, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats such as Hypertext Markup Language (HTML) and Extensible Markup Language (XML) are used to represent data exchanged through a network. In addition, conventional encryption technologies such as Secure Socket Layer (SSL), Transport Layer Security (TLS), Virtual Private Network (VPN), and Internet Protocol Security (IPsec) are used to encrypt all or some links. In other embodiments, custom and/or dedicated data communication technologies may also be used in place of or in addition to the foregoing data communication technologies.

In various embodiments, the virtual item package can also be referred to as a virtual red packet, an electronic red packet, and the like. The virtual item package a virtual carrier that transfers resources (or referred to as virtual items) in a gift form between at least two user accounts. The at least two user accounts may or may not have a friend relationship in a client and/or the real world. The resources (or virtual items) involved in the virtual item package may be currency, game equipment, game materials, game pets, game coins, icons, members, titles, value-added services, points, ingots, gold beans, gift vouchers, redemption vouchers, coupons, greeting cards, and the like. Other types of the resources may be used, in some cases.

Solutions in the embodiments of the present disclosure may be performed by the server cluster in the system shown in FIG. 1. Specifically, when feature information of a target object (which may be a user or a group including a plurality of users) is extracted, the server cluster may extract package attribute vectors respectively corresponding to at least two virtual item packages of the target object. The server cluster may obtain an object attribute vector of the target object, each element in the package attribute vectors indicating one attribute of a corresponding virtual item package. In some cases, each element in the object attribute vector may indicate one attribute of the target object. The server cluster may further perform, by using a first machine learning model, feature extraction on the package attribute vectors respectively corresponding to the at least two virtual item packages to obtain feature vectors respectively corresponding to the at least two virtual item packages. The server cluster may further perform, by using a second machine learning model, feature extraction on the feature vectors respectively corresponding to the at least two virtual item packages and the object attribute vector of the target object to obtain importance fractions respectively corresponding to the at least two virtual item packages. The server cluster may further extract the feature information of the target object according to the feature vectors respectively corresponding to the at least two virtual item packages and the importance fractions respectively corresponding to the at least two virtual item packages.

In various implementations of the foregoing solution, when extracting feature information of a user or a group, the server cluster may perform, with reference to an attribute of the user or the group, feature extraction on feature vectors of virtual item packages used by the user or the group to obtain importance respectively corresponding to the virtual item packages used by the user or the group. Further, the server cluster may extract the feature information with reference to the importance respectively corresponding to the virtual item packages. In this way, differences of users of different attributes may be fully considered when the users are using virtual item packages, thereby improving the accuracy, efficiency, and security of feature information extraction. In this way, the underlying hardware of the system is improved.

In the technical solutions shown in various embodiments, the foregoing feature information extraction solution may be implemented with reference to a recurrent neural network and an attention mechanism. In other words, the first machine learning model is a recurrent neural network model, and the second machine learning model is an attention mechanism model. The following embodiments of the present disclosure give descriptions by using a combination of the recurrent neural network model and the attention mechanism model.

Figure 2:
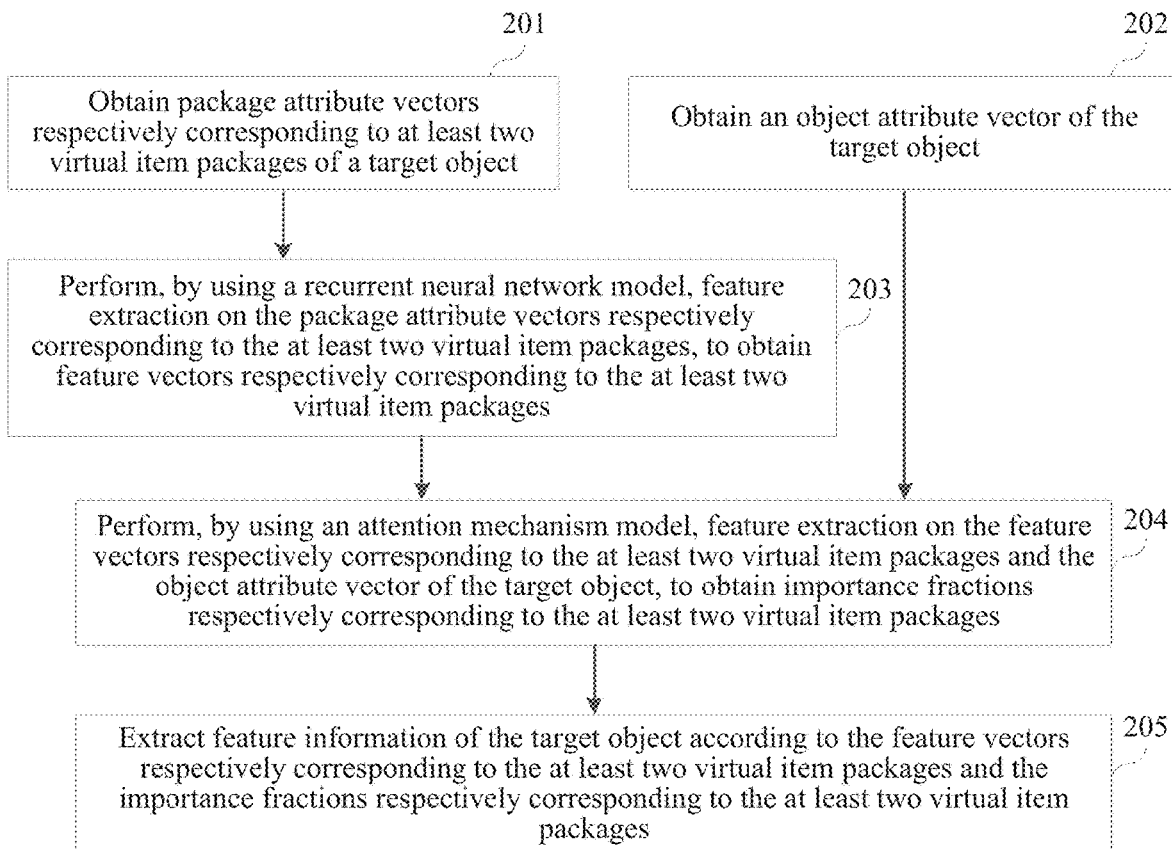
FIG. 2 is a flowchart of a feature information extraction method according to an example embodiment.

FIG. 2 is a flowchart of a feature information extraction method according to an example embodiment. An example in which the method is applied to the server cluster in the system shown in FIG. 1 is used. The feature information extraction method for a target object may include the following steps:

Step 201. Obtain package attribute vectors respectively corresponding to at least two virtual item packages of a target object.

Each element in the package attribute vectors indicates one attribute of a corresponding virtual item package.

In this and various other embodiments, the target object may be a user, or the target object may be a group including at least two users.

Optionally, attributes of a virtual item package may include at least one of a behavior (for example, receiving a virtual item package or sending a virtual item package) of the target object for operating the virtual item package, a type of the virtual item package (for example, a virtual item package sent in a group or a virtual item package sent to an individual), a resource value (for example, a currency amount) of the virtual item package, a quantity by which the virtual item package is divided, a relationship between users involved in the virtual item package (for example, whether a user is a friend to the target object), a time corresponding to the virtual item package, and a message left in the virtual item package.

Optionally, the foregoing process of obtaining the package attribute vectors may be performed by the feature information management platform 142 in the server cluster shown in FIG. 1. For example, the feature information management platform 142 may obtain, from the user operation recording and management server 146, a historical usage record of the target object (which may be a single user or a group) on the at least two virtual item packages. Attributes of the at least two corresponding virtual item packages are obtained from the social network platform 144 according to the historical usage record, and the attributes of the at least two virtual item packages are expressed, according to a predetermined package attribute vector expression rule, as vectors having fixed dimensions, namely, the foregoing package attribute vectors. Each virtual item package corresponds to one package attribute vector.

Optionally, when expressing, according to a predetermined rule, attributes of the virtual item package, as vectors having fixed dimensions, the feature information management platform 142 may separately value the attributes according to a first numerical rule (that is, the foregoing package attribute vector expression rule), and use the valued attributes as values of dimensions in a package attribute vector of the corresponding virtual item package.

For example, the first numerical rule is as follows:

The first element in the package attribute vector corresponds to a behavior of the target object for operating the virtual item package, a receive behavior corresponds to the value 1, and a send behavior corresponds to the value 2.

The second element in the package attribute vector corresponds to a type of the virtual item package, a virtual item package sent in a group corresponds to the value 1, and a virtual item package sent to an individual corresponds to the value 2.

The third element in the package attribute vector corresponds to a resource value of the virtual item package; for example, a value corresponding to a currency amount is the currency value.

The fourth element in the package attribute vector corresponds to a quantity by which the virtual item package is divided, and a corresponding value is the value of the quantity.

The fifth element in the package attribute vector corresponds to a relationship between users involved in the virtual item package. If other users involved in the virtual item package are friends to the target object, the corresponding value is 1. If other users involved in the virtual item package are not friends to the target object, the corresponding value is 2. If some of other users involved in the virtual item package are friends to the target object while some users are not friends to the target object, the corresponding value is 3.

The sixth element in the package attribute vector corresponds to a time corresponding to the virtual item package, the corresponding value is the value of the time. For example, a value of a time corresponding to a virtual item package sent on Dec. 5, 2016 16:17:08 is 20161205161708.

The seventh element in the package attribute vector corresponds to a message left in the virtual item package. Different types of messages correspond to different values. For example, if there is no message, the corresponding value is 0, a holiday greeting message corresponds to the value 1, a birthday greeting message corresponds to the value 2, a wedding greeting message corresponds to the value 3, and other messages correspond to the value 5.

The first numerical rule is used as an example. It is assumed that a virtual item package is a red packet sent by the target object in a group, a total amount of the red packet is 2 RMB and is divided into 5 parts, other users receiving the red packet are friends to the target object, a sending time is Dec. 5, 2016 16:17:08, and the message is "Happy Chinese New Year!", the feature information management platform 142 obtains, according to the foregoing numerical rule, that a package attribute vector corresponding to the virtual item package is (2, 1, 2, 5, 1, 20161205161708, 1).

It should be noted that, in this embodiment of the present disclosure, only the foregoing attributes of the virtual item package are used as examples for description. In actual application, a specific attribute of the virtual item package may be set according to an actual status. Other quantities and types of attributes of the virtual item package may be used.

Step 202. Obtain an object attribute vector of the target object.

Each element in the object attribute vector indicates one attribute of the target object.

In this embodiment of the present disclosure, different types of target objects may correspond to different attributes. For example, when the target object is a single user, attributes of the target object may include the user's age, education, occupation, gender, whether a mailbox is verified, a location, and the like; and when the target object is a group, attributes of the target object may include a quantity of group members, an average age of the group members, average education of the group members, gender distributions of the group members, group active times of the group members, and group name keywords, and the like.

Optionally, the foregoing process of obtaining the package attribute vectors may be performed by the feature information management platform 142 in the server cluster shown in FIG. 1. For example, the feature information management platform 142 may obtain attributes of the target object from the social network platform 144, and express, according to a predetermined object attribute vector expression rule, the attributes of the target object as vectors having fixed dimensions, namely, the foregoing object attribute vector.

Optionally, when expressing, according to a predetermined rule, attributes of the virtual item package, as vectors having fixed dimensions, the feature information management platform 142 may separately value the attributes according to a second numerical rule (that is, the foregoing object attribute vector expression rule), and use the valued attributes as values of dimensions in the object attribute vector.

For example, when the target object is a single user, the second numerical rule is as follows:

The first element in the object attribute vector corresponds to the age of a user, and a corresponding value is the value of the age.

The second element in the object attribute vector corresponds to education of a user. If the user has not been educated, a corresponding value is 0. A primary school qualification corresponds to the value 1. A secondary school qualification corresponds to the value 2. An undergraduate/college degree corresponds to the value 3. A master's degree corresponds to the value 4. A doctor's degree or above corresponds to the value 5.

The third element in the object attribute vector corresponds to an occupation of a user. For example, civil servants correspond to the value 1, professional technical personnel correspond to the value 2, management personnel correspond to the value 3, business/service personnel correspond to the value 4, production personnel correspond to the value 5, soldiers correspond to the value 6, and other personnel correspond to the value 7.

The fourth element in the object attribute vector corresponds to the gender of a user. Males correspond to the value 1, and females correspond to the value 2.

The fifth element in the object attribute vector corresponds to whether a user has verified a mailbox. If the mailbox is verified, a corresponding value is 1. If the mailbox is not verified, a corresponding value is 2.

The sixth element in the object attribute vector corresponds to a location in which a user is located. For example, Beijing corresponds to the value 001, Shanghai corresponds to the value 002, Guangzhou corresponds to the value 003, and Shenzhen corresponds to the value 004.

It is assumed that the target object is a user A, the age is 25, the user A has an undergraduate degree, the occupation is a professional technician, the gender is male, the mailbox is not verified, and the location is Shanghai, the feature information management platform 142 obtains, according to the second numerical rule, that an object attribute vector corresponding to the user A is (25, 3, 2, 1, 2, 002).

Additionally or alternatively, for example, when the target object is a group, the second numerical rule is as follows:

The first element in the object attribute vector corresponds to a total quantity of group members, and a corresponding value is the value of the total quantity of the group members.

The second element in the object attribute vector corresponds to an average age of group members, and a corresponding value is the value of the average age.

The third element in the object attribute vector corresponds to average education of group members. If a group member has not been educated, a corresponding value is 0. A primary school qualification corresponds to the value 1. A secondary school qualification corresponds to the value 2. An undergraduate/college degree corresponds to the value 3. A master's degree corresponds to the value 4. A doctor's degree or above corresponds to the value 5.

The fourth element in the object attribute vector corresponds to gender distributions of group members, and a corresponding value is a ratio of a quantity of male group members to a total quantity of the group members, or may be a ratio a quantity of female group members to a total quantity of the group members.

The fifth element in the object attribute vector corresponds to a group active time. For example, one day is divided into four time periods: morning (6 am to 12 pm), afternoon (12 pm to 6 pm), evening (6 pm to 12 pm), and night (12 pm to 6 am). In each time period, an active state corresponds to the value 1, and a non-active state corresponds to the value 2. For example, if one group is active in the morning and evening, a corresponding value is 1010.

The sixth element in the object attribute vector corresponds to a group name keyword. For example, when the group name keyword includes a word such as "home" or "family", a corresponding value is 1; when the group name keyword includes a word such as "friend" or "friendship", a corresponding value is 2; when the group name keyword includes a word such as "colleague" or a company name, a corresponding value is 3; and other words correspond to the value 4.

It is assumed that the target object is a group A, a total quantity of group members is 30, an average age is 31, average education is undergraduate/college, a ratio of a quantity of male members to the total quantity of the group members is 0.8, a group active time is morning, and a group name is "small team of XX company", the feature information management platform 142 obtains, according to the second numerical rule, that an object attribute vector corresponding to the group A is (30, 31, 3, 0.8, 1000, 3).

It should be noted that, in this embodiment of the present disclosure, the foregoing attributes of the user or group are used as examples for description. In actual application, a specific attribute of the target object may be set according to an actual status. Other quantities and types of attributes of the target object may be used.

Step 203. Perform, by using a recurrent neural network model, feature extraction on the package attribute vectors respectively corresponding to the at least two virtual item packages, to obtain feature vectors respectively corresponding to the at least two virtual item packages.

When the package attribute vectors are trained, the server cluster may sequentially input, in chronological order of the at least two virtual item packages, the package attribute vectors respectively corresponding to the at least two virtual item packages into the recurrent neural network model for feature extraction, to obtain the feature vectors respectively corresponding to the at least two virtual item packages.

A recurrent neural network (RNN) is a manual neural network structure for modeling sequenced data, that is, a training result of data currently output in a sequence is also related to previously output data. A specific expression manner is that the recurrent neural network memorizes the previously input data, and applies the previously input data to calculation of the currently output data. To be specific, nodes between hidden layers are connected, and inputs of the hidden layers not only include an output of an input layer but also include outputs of the hidden layers at a previous moment.

In this and various other embodiments, the package attribute vectors respectively corresponding to the at least two virtual item packages may be regarded as a vector queue arranged in chronological order (that is, a send time or a receive time of the virtual item package). Each package attribute vector in the vector queue is a piece of data to be input into the recurrent neural network model. During feature extraction, the server cluster sequentially inputs, in chronological order, the package attribute vectors respectively corresponding to the at least two virtual item packages into the recurrent neural network model, to obtain the feature vectors respectively corresponding to the at least two virtual item packages.

Optionally, the recurrent neural network model may be a long short term memory (LSTM) recurrent neural network model.

For example, it is assumed that a quantity of the at least two virtual item packages is n, the respective corresponding package attribute vectors are $x_1, x_2, x_3, \ldots,$ and $x_n$, and $x_1$ to $x_n$ are sorted in an order from first to last of times respectively corresponding to the virtual item packages. The server cluster sequentially inputs $x_1$ to $x_n$ to the LSTM recurrent neural network model. For a package attribute vector $x_t$ corresponding to a $t^{th}$ (where $1 \leq t \leq n$, and t is an integer) virtual item package, after the server cluster inputs $x_t$ into the LSTM recurrent neural network model, the LSTM recurrent neural network model calculates, according to the following formulas, a feature vector $h_t$ corresponding to the $t^{th}$ virtual item package:

$$i_t = \tanh(W_{xi}x_t + W_{hi}h_{t-1} + W_{ci}c_{t-1} + b_i);$$

$$f_t = \text{sigm}(W_{xf}x_t + W_{hf}h_{t-1} + W_{cf}c_{t-1} + b_f);$$

$$c_t = f_t c_{t-1} + i_t \tanh(W_{xc}x_t + W_{hc}h_{t-1} + W_{ci}c_{t-1} + b_c);$$

$$o_t = \tanh(W_{xo}x_t + W_{ho}h_{t-1} + W_{co}c_{t-1} + b_o); \text{ and}$$

$$h_t = o_t \tanh(c_t)$$

where $W_{xi}$, $W_{hi}$, $W_{ci}$, $W_{xf}$, $W_{hf}$, $W_{cf}$, $W_{xc}$, $W_{hc}$, $W_{xo}$, $W_{ho}$, and $W_{co}$ are preset parameter matrixes, $b_i$, $b_f$, $b_c$, and $b_o$ are preset offset vectors, $h_{t-1}$ is a feature vector corresponding to a $(t-1)^{th}$ virtual item package in n virtual item packages that are sorted in an order from first to last of times.

$x_1$ to $x_n$ are sequentially input into the LSTM recurrent neural network model. In this way, the feature vectors $h_1 \ldots h_t \ldots h_n$ corresponding to the at least two virtual item packages may be obtained.

In various implementations, the recurrent neural network may be replace with another type of recurrent neural network model. In one example, a threshold recurrent neural network may be used. Other types of the recurrent neural network models may be used Step 204. Perform, by using an attention mechanism model, feature extraction on the feature vectors respectively corresponding to the at least two virtual item packages and the object attribute vector of the target object, to obtain importance fractions respectively corresponding to the at least two virtual item packages.

The server cluster may input the object attribute vector of the target object and the feature vectors respectively corresponding to the at least two virtual item packages into the attention mechanism model, to obtain importance values respectively corresponding to the at least two virtual item packages; and normalize the importance values respectively corresponding to the at least two virtual item packages, to obtain the importance fractions respectively corresponding to the at least two virtual item packages.

An attention mechanism is a mechanism for selecting, by using an external signal, a signal input into the attention mechanism model. During selection of an input signal, the attention mechanism not only can significantly improve performance of a related application, but also can facilitate analysis on an association between a predicted target and the input signal, and provides help to analysis on the related application. In this and various other embodiments of the present disclosure, the server cluster uses the object attribute vector of the target object as an external signal, and trains, by using the attention mechanism model, the feature vectors respectively corresponding to the at least two virtual item packages, to obtain the importance fractions respectively corresponding to the at least two virtual item packages.

For example, in a possible implementation, when performing training by using the attention mechanism model, for the $t^{th}$ virtual item package, the server cluster may input the feature vector $h_t$ corresponding to the $t^{th}$ virtual item package and an object attribute vector a into the following formula, to obtain an importance value $m_t$ of the $t^{th}$ virtual item package:

$$m_t = \tanh(W_a a + W_h h_t)$$

where $W_a$ and $W_h$ are preset parameter matrixes.

By using the foregoing formula, the server cluster obtains the importance values (recorded as $m_1, \ldots, m_t, \ldots,$ and $m_n$) respectively corresponding to the at least two virtual item packages, and normalizes the importance values respectively corresponding to the at least two virtual item packages, to obtain the importance fractions (recorded as $s_1, \ldots, s_t, \ldots,$ and $s_n$) respectively corresponding to the at least two virtual item packages, where $$(s_1, \ldots, s_t, \ldots s_n) = \left( \frac{e^{m_1}}{\sum e^{m_i}}, \ldots, \frac{e^{m_t}}{\sum e^{m_i}}, \ldots \frac{e^{m_n}}{\sum e^{m_i}} \right), i \in [1, n];$$

and $\sum s_i = 1$

Step 205. Extract feature information of the target object according to the feature vectors respectively corresponding to the at least two virtual item packages and the importance fractions respectively corresponding to the at least two virtual item packages.

The server cluster may perform, according to the importance fractions respectively corresponding to the at least two virtual item packages, weighted summation on the feature vectors respectively corresponding to the at least two virtual item packages, and extract a vector obtained through the weighted summation as the feature information of the target object.

For example, an implementation in which the importance fractions respectively corresponding to the at least two virtual item packages are $s_1, \ldots, s_t, \ldots,$ and $s_n$ may be used. the server cluster may perform, by using $(s_1, \ldots, s_t, \ldots,$ and $s_n)$, weighted summation on the feature vectors $(h_1 \ldots h_t \ldots h_n)$ corresponding to the at least two virtual item packages, and use a vector h as the feature information of the target object, where $$h = \Sigma s_i h_i, 1 \in [1, n]$$

Additionally or alternatively, in another possible implementation, the server cluster may further sort, in an order from high to low of the corresponding importance fractions, the feature vectors respectively corresponding to the at least two virtual item packages, and extract an average value of the first j sorted feature vectors as the feature information of the target object, where $1 \leq j \leq n$, j and n are integers, and n is a quantity of the at least two virtual items.

For example, after obtaining, through calculation in step 204, the importance fractions respectively corresponding to the at least two virtual item packages, the server cluster may sort the feature vectors of the at least two virtual item packages in an order from high to low of the importance fractions, and calculate an average value of the first j feature vectors, to obtain the feature information of the target object. It should be noted that, when j=1, the server cluster obtains, as the feature information of the target object, a feature vector corresponding to a virtual item package having a highest importance fraction.

Optionally, in this embodiment, after extracting the feature information of the target object, the server cluster may further apply the feature information of the target object to a specific service. For example, the server cluster may classify the target object (specifically, the classification may be predicting the quality of credit of a single user, or determining whether a group is a gambling group, and so on) according to the feature information of the target object, or the server cluster may use the feature information of the target object as a sample to train a related machine learning model (for example, the foregoing recurrent neural network and attention mechanism model).

Figure 3:
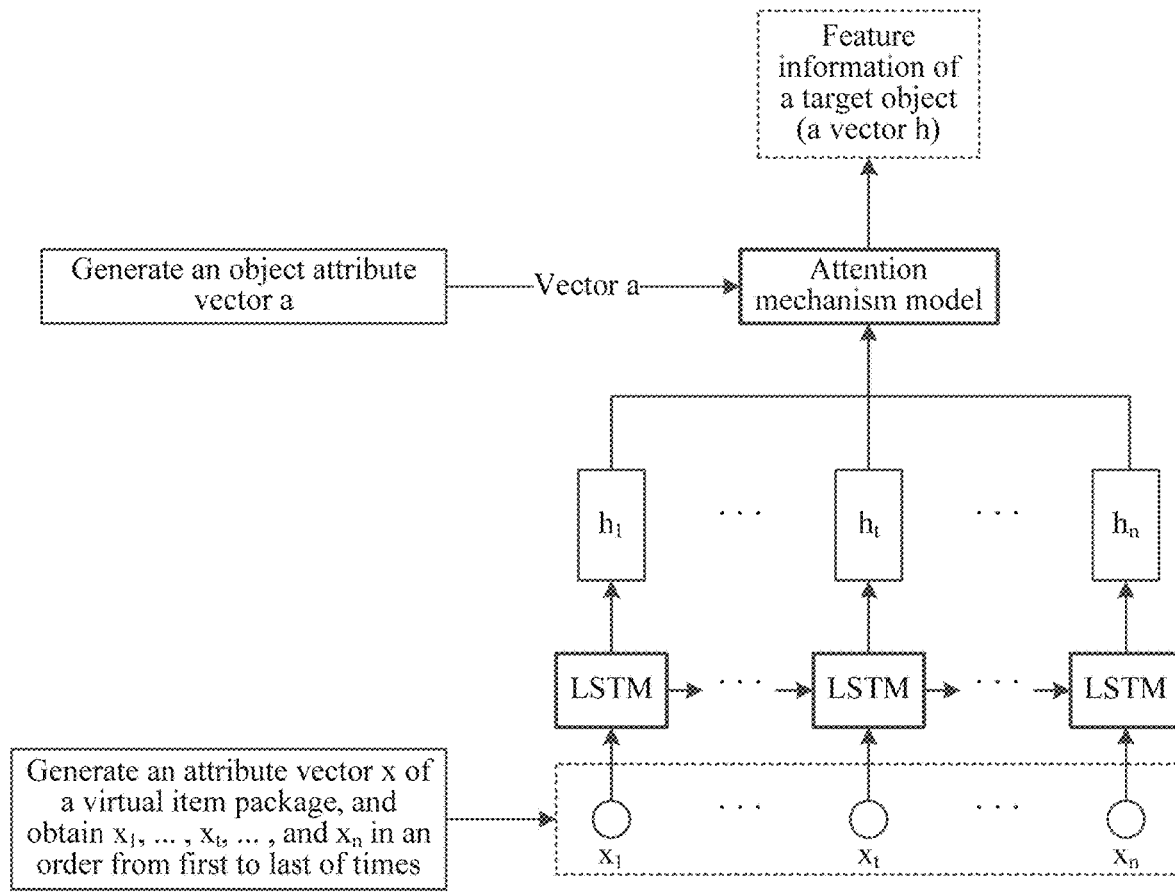
FIG. 3 is a schematic implementation diagram of a technical solution in the example embodiment shown in FIG. 2.

FIG. 3 is a schematic implementation diagram of a technical solution according to an embodiment. An example in which this solution is performed by the server cluster in the system shown in FIG. 1 is used. As shown in FIG. 3, the feature information management platform 142 in the server cluster obtains, from the user operation recording and management server 146, historical usage records of a target object (a user or a group) on virtual item packages, extracts identifiers of the virtual item packages used by the target object, and extracts attributes of the virtual item packages from a server on the social network platform 144 according to the identifiers of the virtual item packages used by the target object. Corresponding to each virtual item package, the feature information management platform 142 generates an attribute vector x of the virtual item package, sorts attribute vectors of the virtual item packages in an order from first to last of respective corresponding times, to obtain vector sequences $x_1, \ldots, x_t, \ldots,$ and $x_n$. In addition, the feature information management platform 142 further extracts an attribute of the target object from the server on the social network platform 144, and generates an object attribute vector a according to the attribute of the target object. The feature information management platform 142 sequentially inputs the vector sequences $x_1, \ldots, x_t, \ldots,$ and $x_n$ into an LSTM recurrent neural network model in an order from first to last, to obtain feature vectors respectively corresponding to the virtual item packages, namely, $h_1, \ldots, h_t, \ldots,$ and $h_n$ in FIG. 3. The feature information management platform 142 inputs the feature vectors respectively corresponding to the virtual item packages and the object attribute vector a into an attention mechanism model. The attention mechanism model calculates importance fractions of the virtual item packages according to the feature vectors respectively corresponding to the virtual item packages and the object attribute vector a, performs, according to the calculated importance fractions, weighted summation on the feature vectors respectively corresponding to the virtual item packages, and outputs a vector h obtained through the weighted summation as feature information of the target object.

According to the technical solution in this and various other embodiments, the virtual item package sequence may be modeled by using time sequence information of a virtual item package sequence (that is, a sequence consisting of the foregoing package attribute vectors) and basic portrait information (that is, the foregoing object attribute vector) of the target object (a user or a group). In this way, not only complex manual feature extraction is not needed, but also the important feature information matching the attribute of the target object can be effectively extracted from the feature vectors of the virtual item packages, thereby extracting the feature information of the target object based on a basic portrait of the target object. For example, for at least two same virtual item packages, if the target object is a 12-year-old user, a virtual item package that has a high price in the at least two virtual item packages and that is sent by the user may be an abnormal virtual item package. By using the foregoing method, when extracting feature information of the user and using attributes such as the age of the user as an attention signal, the server cluster may extract a feature vector corresponding to the virtual item package having a high price from virtual item packages sent by the user.

In addition, historical data of receiving and sending virtual item packages by a user or a group on a social network platform may be regarded as typical social behavior sequence data, which reflects behavior features of the user or the group. Proper modeling on the sequence data of the virtual item packages may be widely applied to user or group credit prediction, group feature prediction, user or group behavior feature analysis, and the like. Sequence data of virtual item packages is not the same between users of different ages, genders, education levels, or between groups of different ages, genders, educational qualifications, or between groups of different topics. Therefore, basic portrait information of a user or a group has important value for discovering abnormal or important data in the sequence data of virtual item packages of the user or the group. Based on this, in the foregoing solution in this embodiment of the present disclosure, the sequence data of the virtual item packages is modeled by using a recurrent neural network, and different time-point states (that is, the feature vectors of the foregoing virtual item packages) corresponding to the sequence data of the virtual item packages are selected by using the basic portrait information of the user or the group as an attention signal, so that information of different importance in the sequence data of the virtual item packages used by different users or groups is modeled according to basic portrait information of the users or groups, to improve the accuracy, efficiency, and security of feature information extraction. In this way, the underlying hardware of the system is improved.

According to the feature information extraction method provided in this and various other embodiments, when extracting feature information of a user or a group, the server cluster performs, with reference to attributes of the user or the group, feature extraction on feature vectors of virtual item packages used by the user or the group to obtain importance fractions respectively corresponding to the virtual item package used by the user or the group. The server cluster may further extract the feature information with reference to the importance fractions respectively corresponding to the virtual item packages. In this way, differences between users of different attributes when the users are using virtual item packages may be fully considered; and a problem in the related technology that only attribute information of the virtual item packages is extracted thereby improving the accuracy, efficiency, and security of feature information extraction with reference to the attributes of the user and attributes of the virtual item packages. In this way, the underlying hardware of the system is improved.

In addition, according to the method provided in this and various other embodiments, the package attribute vectors of the virtual item packages corresponding to the user or the group are sequentially input into a recurrent neural network model in an order of respective corresponding times, to obtain the feature vectors respectively corresponding to the virtual item packages; and then feature extraction is performed on the feature vectors of the virtual item packages by using the attributes of the user or the group. In this way, influence of time sequence information of the virtual item package on feature information extraction is fully considered, thereby further improving the accuracy, efficiency, and security of feature information extraction. In this way, the underlying hardware of the system is improved.

In addition, according to the method provided in this and various other embodiments, the target object may be classified according to the feature information of the target object, or the feature information of the target object is used as a sample to train a related machine learning model, to improve the accuracy, efficiency, and security of target object classification or machine training. In this way, the underlying hardware of the system is improved.

In the example embodiment shown in FIG. 2, after extracting the feature information of the target object, the server cluster may input the feature information of the target object into another application, for example, input the feature information of the target object into a classifier, to classify the target object. Further, when a classification of the target object is known, the classifier and the training models (including the first machine learning model and the second machine learning model) in the example embodiment shown in FIG. 2 may be modified, to improve the accuracy, efficiency, and security of feature extraction and classification. Specifically, for example, the first machine learning model is a recurrent neural network model, and the second machine learning model is an attention mechanism model, referring to the solution shown in FIG. 4.

Figure 4:
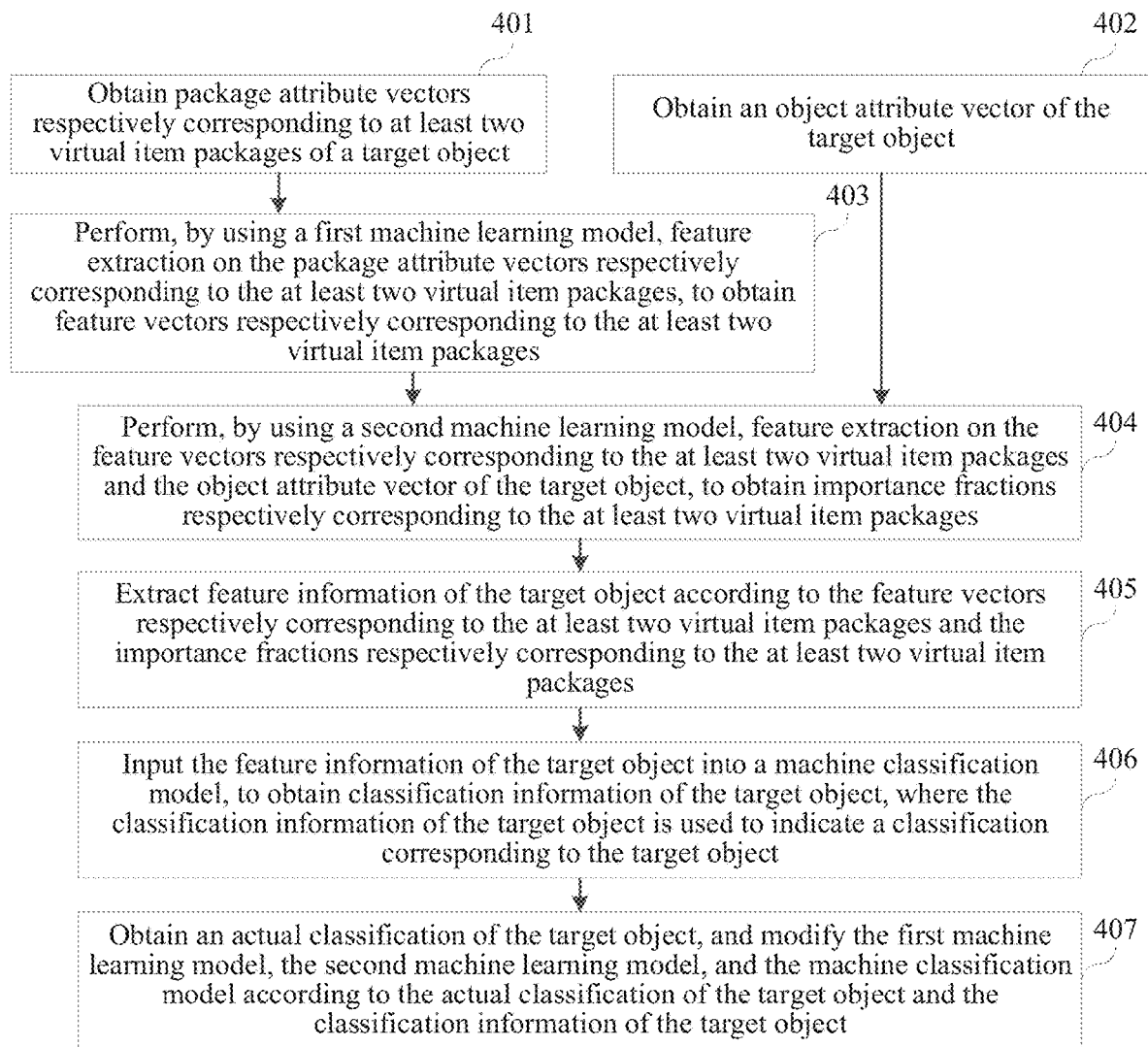
FIG. 4 is a flowchart of a feature information extraction method according to an example embodiment.

FIG. 4 is a flowchart of a feature information extraction method according to an example embodiment. An example in which the method is applied to the server cluster in the system shown in FIG. 1 is used. The feature information extraction method may include the following steps:

Step 401. Obtain package attribute vectors respectively corresponding to at least two virtual item packages of a target object.

Each element in the package attribute vectors indicates one attribute of a corresponding virtual item package.

Step 402. Obtain an object attribute vector of the target object.

Each element in the object attribute vector indicates one attribute of the target object.

For execution processes of step 401 and step 402, refer to descriptions of step 201 and step 202 in the embodiment shown in FIG. 2, and details are not described herein again.

Step 403. Perform, by using a first machine learning model, feature extraction on the package attribute vectors respectively corresponding to the at least two virtual item packages, to obtain feature vectors respectively corresponding to the at least two virtual item packages.

The first machine learning model may be a recurrent neural network model. When the package attribute vectors are trained, the server cluster may sequentially input, in chronological order of the at least two virtual item packages, the package attribute vectors respectively corresponding to the at least two virtual item packages into the recurrent neural network model for feature extraction, to obtain the feature vectors respectively corresponding to the at least two virtual item packages.

Optionally, the recurrent neural network model may include a first recurrent neural network model and a second recurrent neural network model. The server cluster may sequentially input, in an order from first to last of times respective corresponding to the at least two virtual item packages, the package attribute vectors respectively corresponding to the at least two virtual item packages into the first recurrent neural network model for feature extraction, to obtain first parts of feature vectors respectively corresponding to the at least two virtual item packages, The server cluster may sequentially input, in an order from last to first of the times respectively corresponding to the at least two virtual item packages, the package attribute vectors respectively corresponding to the at least two virtual item packages into the second recurrent neural network model for feature extraction, to obtain second parts of feature vectors respectively corresponding to the at least two virtual item packages; and for any one of the at least two virtual item packages, concatenate a first part of feature vector of the virtual item package with a second part of feature vector of the virtual item package, to obtain a feature vector of the virtual item package.

In some cases, to model each virtual item package the package attribute vectors respectively corresponding to the at least two virtual item packages may be sequentially input, in an order from last to first of the corresponding times, into another recurrent neural network model of the same type, and vectors of each virtual item package that are obtained through twice recurrent neural network model training are concatenated, to obtain a feature vector of the virtual item package. For example, using the foregoing $t^{th}$ virtual item package as an example, it is assumed that when sequential inputting is performed in an order from first to last of times, a vector obtained by inputting a package attribute vector $x_t$ corresponding to the $t^{th}$ virtual item package into an LSTM recurrent neural network model is $h_{t-1}$. During sequential inputting in an order from last to first of the times, a vector obtained by inputting the package attribute vector $x_t$ corresponding to the $t^{th}$ virtual item package into another LSTM recurrent neural network model is $h_{t-2}$, and a feature vector corresponding to the $t^{th}$ virtual item package is $h_t=[h_{t-1}, h_{t-2}]$.

In various implementations, other types of recurrent neural network model may also be used, such as a threshold recurrent neural network. A specific type of the recurrent neural network model is not limited in this and various other embodiments.

Step 404. Perform, by using a second machine learning model, feature extraction on the feature vectors respectively corresponding to the at least two virtual item packages and the object attribute vector of the target object, to obtain importance fractions respectively corresponding to the at least two virtual item packages.

The second machine learning model may be an attention mechanism model. The server cluster may input the object attribute vector of the target object and the feature vectors respectively corresponding to the at least two virtual item packages into the attention mechanism model, to obtain importance values respectively corresponding to the at least two virtual item packages; and normalize the importance values respectively corresponding to the at least two virtual item packages, to obtain the importance fractions respectively corresponding to the at least two virtual item packages.

Step 405. Extract feature information of the target object according to the feature vectors respectively corresponding to the at least two virtual item packages and the importance fractions respectively corresponding to the at least two virtual item packages.

The server cluster may perform, according to the importance fractions respectively corresponding to the at least two virtual item packages, weighted summation on the feature vectors respectively corresponding to the at least two virtual item packages, and extract a vector obtained through the weighted summation as the feature information of the target object.

Alternatively, in another possible implementation, the server cluster may extract j feature vectors corresponding highest importance fractions in the feature vectors respectively corresponding to the at least two virtual item packages as the feature information of the target object, where $1 \leq j \leq k$, j and k are integers, and k is a quantity of the at least two virtual items.

Step 406. Input the feature information of the target object into a machine classification model, to obtain classification information of the target object, where the classification information of the target object is used to indicate a classification corresponding to the target object.

The server cluster may input h into the machine classification model, for example, a logistic regression classifier or a support vector classifier, to determine the classification of the target object, for example, determine a credit level (for example, extremely good, good, medium, poor, or extremely poor) of a signal user, or determine whether a group is a gambling group.

For example, the target object is a single user, and the machine classification model is a logistic regression classifier model configured to determine a credit level of a single user, an output value of the machine classification model corresponding to a user having good credit is 0, and an output value of the machine classification model corresponding to a user having poor credit is 1. Assuming that feature information of the user is h, the server cluster inputs h into the logistic regression classifier model, to obtain that a probability that the user u has good credit is p (u=0), and a probability that the user u has poor credit is p (u=1); and $$p(u=0) = \frac{1}{1+e^{-Wh}} \text{ and } p(u=1) = \frac{e^{-Wh}}{1+e^{-Wh}},$$

where W is a parameter of the logistic regression classifier model.

Step 407. Obtain an actual classification of the target object, and modify the first machine learning model, the second machine learning model, and the machine classification model according to the actual classification of the target object and the classification information of the target object.

Optionally, when the actual classification of the target object is known, the feature information of the target object may further be used to modify parameters in the foregoing machine learning models by using related training algorithms (for example, a stochastic gradient descent algorithm), for example, to modify parameters (for example, the foregoing parameter matrix and offset vector) in the recurrent neural network model, the attention mechanism model, and the machine classification model.

Specifically, for example, the machine classification model is the foregoing logistic regression classifier model. If an actual classification (that is, good credit or poor credit) of a user is known, it may be obtained, by using the classification information, p (u=0) and p (u=1), of the target object that a loss function for the first machine learning model (that is, the LSTM recurrent neural network model), the second machine learning model (that is, the attention mechanism model), and the machine classification model (that is, the logistic regression classifier model) is as follows:

$$L = y \cdot p(u=0) + (1-y) \cdot p(u=1),$$

where y is an actual classification of a user, when the user has good credit, y=0; and when the user has poor credit, y=1.

The server cluster modifies a parameter E of the first machine learning model (that is, the LSTM recurrent neural network model), the second machine learning model (that is, the attention mechanism model), and the machine classification model (that is, the logistic regression classifier model) by using the stochastic gradient descent algorithm and the loss function, and a modification formula is as follows:

$$E = E - \alpha \cdot \frac{\partial L}{\partial E},$$

where the parameter E is all parameters of the first machine learning model (that is, the LSTM recurrent neural network model), the second machine learning model (that is, the attention mechanism model), and the machine classification model (that is, the logistic regression classifier model) in this solution. For example, the parameter E may include $W_{xi}$, $W_{hi}$, $W_{ci}$, $W_{xf}$, $W_{hf}$, $W_{cf}$, $W_{xc}$, $W_{hc}$, $W_{xo}$, $W_{ho}$, $W_{co}$, $b_i$, $b_f$, $b_c$, and $b_o$ in the LSTM recurrent neural network model, $W_a$ and $W_h$ in the attention mechanism model, and the parameter W in the logistic regression classifier model.

$$\frac{\partial L}{\partial E}$$

is a derivative of the loss function L to the parameter E.

After the parameter E is modified, for a new user u', the server cluster calculates classification information y' of the new user u' by using the modified parameter E and according to step 401 to step 406, where specifically:

$$y' = \begin{cases} 0 & \text{if } p(u'=0) > p(u'=1) \\ 1 & \text{if } p(u'=0) \leq p(u'=1) \end{cases},$$

where p(u'=0) is a probability that the user u' has good credit, and p(u'=1) is a probability that the user u' has poor credit.

Figure 5:
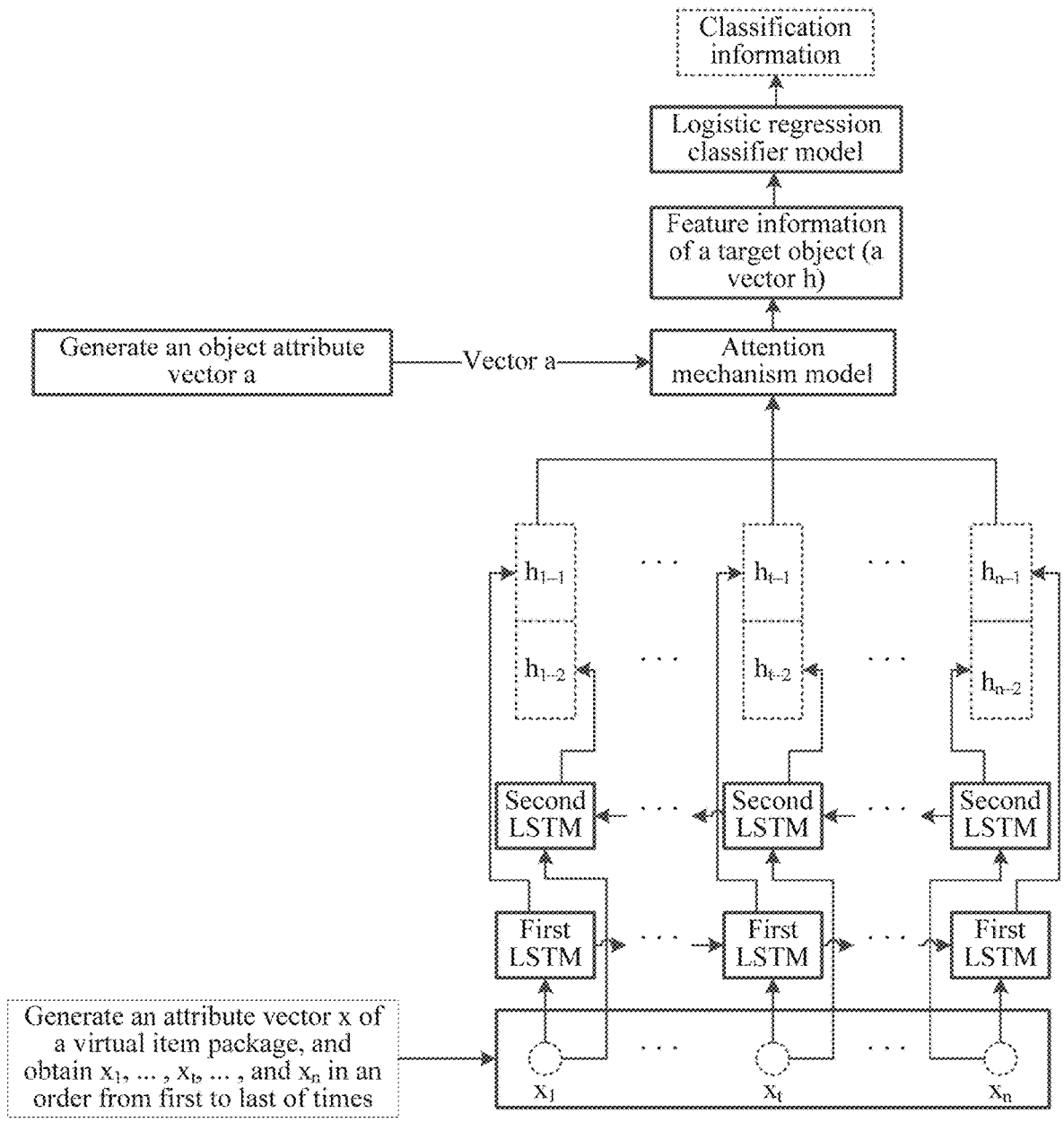
FIG. 5 is a schematic implementation diagram of a technical solution in the example embodiment shown in FIG. 4.

FIG. 5 is a schematic implementation diagram of a technical solution according to an embodiment. An example in which this technical solution is performed by the server cluster in the system shown in FIG. 1 is used. As shown in FIG. 5, the feature information management platform 142 in the server cluster obtains, from the user operation recording and management server 146, historical usage records of a target object (a user or a group) on virtual item packages, extracts identifiers of the virtual item packages used by the target object, and extracts attributes of the virtual item packages from a server on the social network platform 144 according to the identifiers of the virtual item packages used by the target object. Corresponding to each virtual item package, the feature information management platform 142 generates an attribute vector x of the virtual item package, sorts attribute vectors of the virtual item packages in an order from first to last of respective corresponding times, to obtain vector sequences $x_1, \ldots, x_t, \ldots,$ and $x_n$. In addition, the feature information management platform 142 further extracts an attribute of the target object from the server on the social network platform 144, and generates an object attribute vector a according to the attribute of the target object. The feature information management platform 142 sequentially inputs the vector sequences $x_1, \ldots, x_t, \ldots,$ and $x_n$ into a first LSTM recurrent neural network model in an order from first to last, to obtain feature vectors respectively corresponding to the virtual item packages, namely, $h_{1-1}, \ldots, h_{t-1}, \ldots,$ and $h_{n-1}$ of $h_{1-1}$ in FIG. 5. In addition, the feature information management platform 142 sequentially inputs the vector sequence $x_1, \ldots, x_t, \ldots,$ and $x_n$ into a second LSTM recurrent neural network model in an order from last to first, to obtain feature vectors respectively corresponding to the virtual item packages, namely, $h_{1-2}, \ldots, h_{t-2}, \ldots,$ and $h_{n-2}$ in FIG. 5. After concatenating two feature vectors respectively corresponding to the virtual item packages, the feature information management platform 142 inputs the concatenated feature vectors respectively corresponding to the virtual item packages and the object attribute vector a into an attention mechanism model. The attention mechanism model calculates importance fractions of the virtual item packages according to the concatenated feature vectors respectively corresponding to the virtual item packages and the object attribute vector a; performs, according to the calculated importance fractions, weighted summation on the concatenated feature vector respectively corresponding to the virtual item packages; and outputs a vector obtained through the weighted summation as feature information of the target object. The feature information management platform 142 inputs the feature information of the target object into a logistic regression classifier model, to obtain classification information of the target object.

According to the feature information extraction method provided in this and various other embodiments, when extracting feature information of a user or a group, the server cluster performs, with reference to attributes of the user or the group, feature extraction on feature vectors of virtual item packages used by the user or the group, to obtain importance fractions respectively corresponding to the virtual item package used by the user or the group, and extracts the feature information with reference to the importance fractions respectively corresponding to the virtual item packages. In this way, differences between users of different attributes when the users are using virtual item packages are fully considered; and a problem in the related technology that only attribute information of the virtual item packages is extracted thereby improving the accuracy, efficiency, and security of feature information extraction with reference to the attributes of the user and attributes of the virtual item packages. In this way, the underlying hardware of the system is improved.

In addition, according to the method provided in this and various other embodiment, the package attribute vectors are sequentially input into a recurrent neural network model in an order from first to last of respective corresponding times, and the package attribute vectors of the virtual item packages are sequentially input into another recurrent neural network model in an order from last to first of the respective corresponding times. For each package attribute vector, feature vectors corresponding to the package attribute vector output by the two recurrent neural network models are concatenated, to model a feature vector of each virtual item package more effectively, and improve the accuracy, efficiency, and security of subsequent feature information extraction. In this way, the underlying hardware of the system is improved.

In addition, according to the method provided in this embodiment, the target object may be classified according to the feature information of the target object by using a machine classification model. In addition, when an actual classification of the target object is known, the first machine learning model, the second machine learning model, and the machine classification model may further be modified according to the classification information of the target object.

Figure 6:
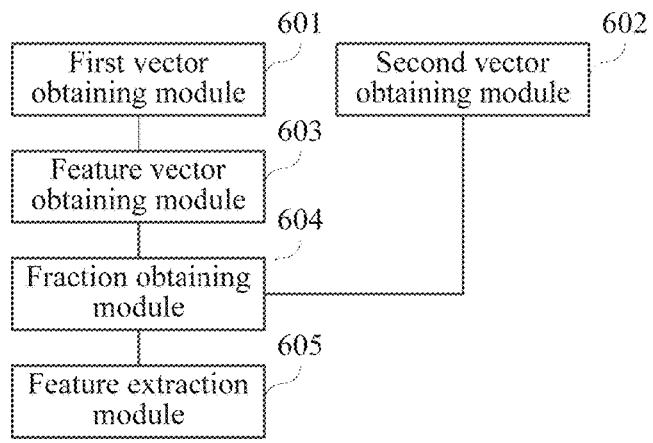
FIG. 6 is a structural block diagram of a feature information extraction apparatus according to an example embodiment.

FIG. 6 is a structural block diagram of a feature information extraction apparatus according to an example embodiment. The feature information extraction apparatus may be implemented as a part or all of a server cluster in a form of hardware or a combination of software and hardware, to perform all or some steps in the embodiment shown in FIG. 2 or FIG. 4. The feature information extraction apparatus may include various hardware components.

The feature information extraction apparatus may include a first vector obtaining module 601, which may include circuitry, configured to obtain package attribute vectors respectively corresponding to at least two virtual item packages of a target object, each element in the package attribute vectors indicating one attribute of a corresponding virtual item package.

The feature information extraction apparatus may include a second vector obtaining module 602, which may include circuitry configured to obtain an object attribute vector of the target object, each element in the object attribute vector indicating one attribute of the target object.

The feature information extraction apparatus may include a feature vector obtaining module 603, which may include circuitry, configured to perform, by using a first machine learning model, feature extraction on the package attribute vectors respectively corresponding to the at least two virtual item packages, to obtain feature vectors respectively corresponding to the at least two virtual item packages.

The feature information extraction apparatus may include a fraction obtaining module 604, which may include circuitry, configured to perform, by using a second machine learning model, feature extraction on the feature vectors respectively corresponding to the at least two virtual item packages and the object attribute vector of the target object, to obtain importance fractions respectively corresponding to the at least two virtual item packages.

The feature information extraction apparatus may include a feature extraction module 605, configured to extract feature information of the target object according to the feature vectors respectively corresponding to the at least two virtual item packages and the importance fractions respectively corresponding to the at least two virtual item packages.

Optionally, the first machine learning model is a recurrent neural network model. Further, the feature vector obtaining module is configured to sequentially input, in chronological order of the at least two virtual item packages, the package attribute vectors respectively corresponding to the at least two virtual item packages into the recurrent neural network model for feature extraction, to obtain the feature vectors respectively corresponding to the at least two virtual item packages.

Optionally, the recurrent neural network model includes a first recurrent neural network model and a second recurrent neural network model. The feature vector obtaining module may include various hardware unit, which may include circuitry. The feature vector obtaining module may include a first vector obtaining unit, configured to sequentially input, in an order from first to last of times respectively corresponding to the at least two virtual item packages, the package attribute vectors respectively corresponding to the at least two virtual item packages into the first recurrent neural network model for feature extraction, to obtain first parts of feature vectors respectively corresponding to the at least two virtual item packages. The feature vector obtaining module may include a second vector obtaining unit, configured to sequentially input, in an order from last to first of the times respectively corresponding to the at least two virtual item packages, the package attribute vectors respectively corresponding to the at least two virtual item packages into the second recurrent neural network model for feature extraction, to obtain second parts of feature vectors respectively corresponding to the at least two virtual item packages. The feature vector obtaining module may include a concatenating unit, configured to: for any one of the at least two virtual item packages, concatenate a first part of feature vector of the virtual item package with a second part of feature vector of the virtual item package, to obtain a feature vector of the virtual item package.

Optionally, the recurrent neural network model is a long short term memory recurrent neural network model or a threshold recurrent neural network.

Optionally, the second machine learning model is an attention mechanism model. The fraction obtaining module include various units that may include circuitry. The fraction obtaining module may include a value obtaining unit, configured to input the object attribute vector of the target object and the feature vectors respectively corresponding to the at least two virtual item packages into the attention mechanism model, to obtain importance values respectively corresponding to the at least two virtual item packages. The fraction obtaining module may include a normalizing unit, configured to normalize the importance values respectively corresponding to the at least two virtual item packages, to obtain the importance fractions respectively corresponding to the at least two virtual item packages.

Optionally, the feature extraction module may perform various actions. In some cases, the actions may include performing, according to the importance fractions respectively corresponding to the at least two virtual item packages, weighted summation on the feature vectors respectively corresponding to the at least two virtual item packages, and extract a vector obtained through the weighted summation as the feature information of the target object. Additionally or alternatively, the actions may include sorting, in an order from high to low of the corresponding importance fractions, the feature vectors respectively corresponding to the at least two virtual item packages, and extract an average value of the first j sorted feature vectors as the feature information of the target object, where $1 \leq j \leq n$, j and n are integers, and n is a quantity of the at least two virtual items.

Optionally, the apparatus may further include various modules, which may include circuitry. In some cases, the apparatus may include a classification module, configured to input the feature information of the target object into a machine classification model, to obtain classification information of the target object, where the classification information of the target object is used to indicate a classification corresponding to the target object. In some cases, the actions may include a classification obtaining module, configured to obtain an actual classification of the target object. In some cases, the actions may include a modification module, configured to modify the first machine learning model, the second machine learning model, and the machine classification model according to the actual classification of the target object and the classification information of the target object.

According to the feature information extraction apparatus provided in this and various other embodiments, when extracting feature information of a user or a group, the server cluster performs, with reference to attributes of the user or the group, feature extraction on feature vectors of virtual item packages used by the user or the group, to obtain importance respectively corresponding to the virtual item package used by the user or the group. The server cluster may further extract the feature information with reference to the importance respectively corresponding to the virtual item packages. In this way, differences between users of different attributes when the users are using virtual item packages may be fully considered. Thereby the server cluster improves the accuracy, efficiency and security of feature information extraction with reference to the attributes of the user and attributes of the virtual item packages. In this way, the operation of the underlying hardware is improved.

In addition, according to the apparatus provided in this and various other embodiments, the package attribute vectors of the virtual item packages corresponding to the user or the group are sequentially input into a recurrent neural network model in an order of respective corresponding times, to obtain the feature vectors respectively corresponding to the virtual item packages; and then feature extraction is performed on the feature vectors of the virtual item packages by using the attributes of the user or the group. In this way, influence of time sequence information of the virtual item package on feature information extraction may be fully considered, thereby further improving the accuracy, efficiency, and security of feature information extraction. In this way, the operation of the underlying hardware is improved.

In addition, according to the apparatus provided in this and various other embodiment, the package attribute vectors are sequentially input into a recurrent neural network model in an order from first to last of respective corresponding times, and the package attribute vectors of the virtual item packages are sequentially input into another recurrent neural network model in an order from last to first of the respective corresponding times. For each package attribute vector, feature vectors corresponding to the package attribute vector output by the two recurrent neural network models are concatenated, to model a feature vector of each virtual item package more effectively, and improve the accuracy, efficiency, and security of subsequent feature information extraction. In this way, the operation of the underlying hardware is improved.

In addition, according to the apparatus provided in this and various other embodiment, the target object may further be classified according to the feature information of the target object by using a machine classification model. In addition, when the actual classification of the target object is known, the first machine learning model, the second machine learning model, and the machine classification model may further be modified according to the classification information of the target object.

Figure 7:
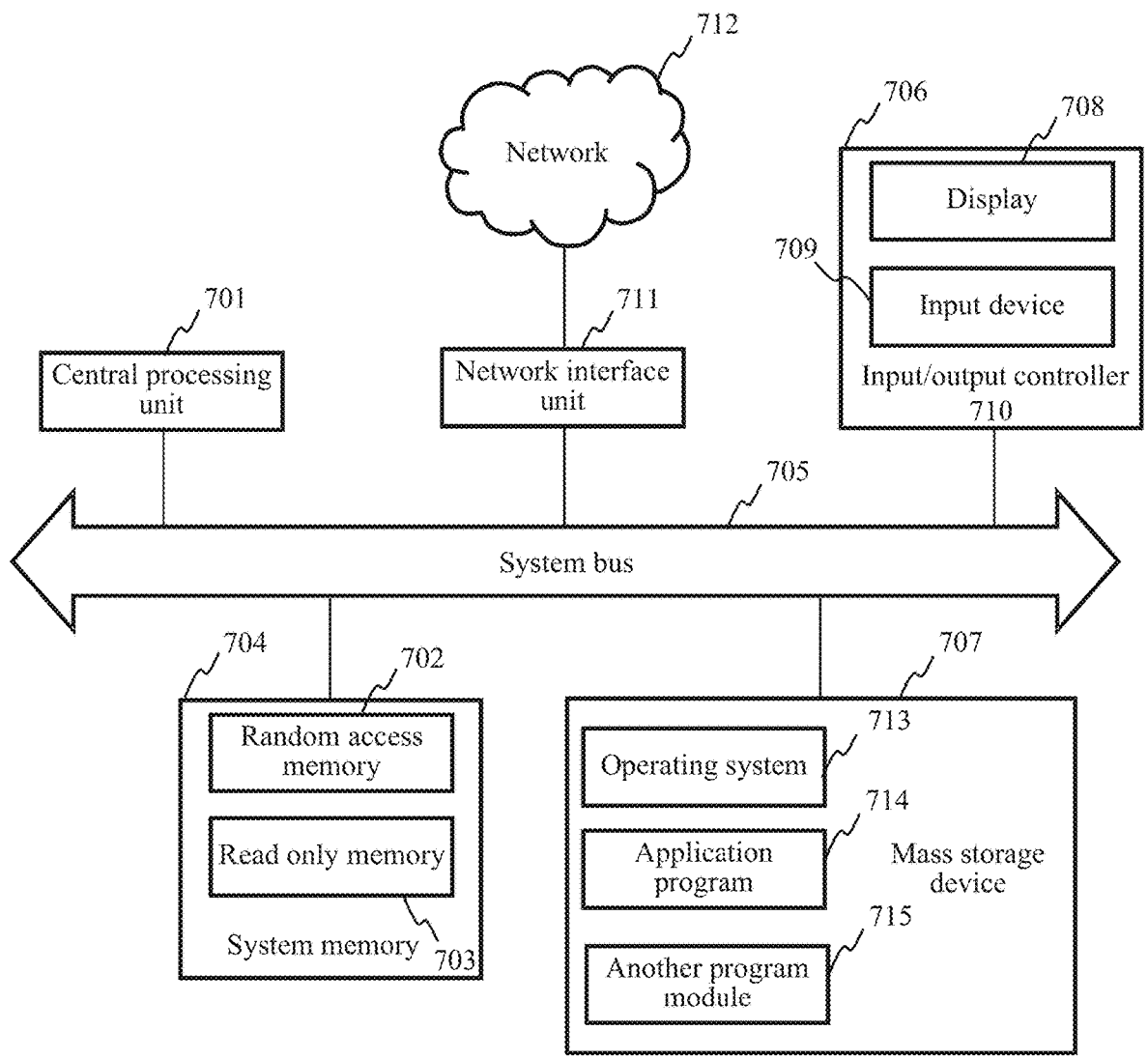
FIG. 7 is a schematic structural diagram of a server according to an example embodiment.

FIG. 7 is a schematic structural diagram of a server cluster according to an example embodiment. The server cluster 700 includes a central processing unit (CPU) 701, a system memory 704 including a random access memory (RAM) 702 and a read only memory (ROM) 703, and a system bus 705 connecting the system memory 704 to the central processing unit 701. The server cluster 700 further includes an example input/output system (I/O system) 706 for helping information transmission between components in a computer, and a mass storage device 707 configured to store an operating system 713, an application program 714, and another program module 715.

The example I/O system 706 includes a display 708 configured to display information, and an input device 709 used by a user to input information, such as a mouse or a keyboard. The display 708 and the input device 709 are connected to an input/output controller 705 of the system bus 710, to be connected to the CPU 701. The example I/O system 706 may further include the input/output controller 710, to receive and process inputs from multiple other devices, such as the keyboard, the mouse, or an electronic stylus. Similarly, the input/output controller 710 further provides an output to a display screen, a printer, or another type of output device.

The mass storage device 707 is connected to the central processing unit 701 by using a mass storage controller (not shown) connected to the system bus 705. The mass storage device 707 and a computer readable medium associated with the mass storage device 707 provide non-volatile storage to the server cluster 700. That is, the mass storage device 707 may include a computer readable medium (not shown), such as a hard disk or a CD-ROM drive.

In some cases, the computer readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. However, the computer storage medium may include other storage paradigms. The system memory 704 and the mass storage device 707 may be collectively referred to as a memory.

According to various embodiments, the server cluster 700 may be further connected to a remote computer on a network for operation by using a network such as the Internet. That is, the server cluster 700 may be connected to a network 712 by using a network interface unit 711 connected to the system bus 705, or may be connected to another type of network or a remote computer system (not shown) by using a network interface unit 711.

The memory further includes one or more programs. The one or more programs are stored in a memory. The central processing unit 701 implements the feature information extraction method shown in FIG. 2 or FIG. 4 by executing the one or more programs.

An example embodiment further provides a non-transitory computer readable storage medium including instructions, for example, a memory including instructions. The instructions may be executed by a processor in a server, to implement the feature information extraction method according to various embodiments of the present disclosure. For example, the non-transitory computer readable storage medium may be a ROM, a random access memory (RAM), a CD-ROM, a magnetic tape, a floppy disk, an optical data storage device, or the like.

Upon consideration of the specification and practice of the implementations specifically disclosed herein, one will readily appreciate other implementations of the present disclosure. Variations, uses, or adaptations of the present disclosure, and the variations, uses, and adaptations follow a general principle of the present disclosure and include common sense or common technical means in this technical field are included in this disclosure. The specification and the embodiments are considered as examples illustrating the principles of the architectures and techniques that may be used in various solutions.

It should be understood that the disclosure is not limited to the precise structures described above and shown in the accompanying drawings, and various modifications and changes can be made without departing from the disclosure.

What is claimed is:

1. A feature information extraction method, applied to a server cluster, and comprising:
   obtaining package attribute vectors respectively corresponding to at least two virtual item packages of a target object, and obtaining an object attribute vector of the target object, each element in the package attribute vectors indicating one attribute of a corresponding virtual item package, and each element in the object attribute vector indicating one attribute of the target object;
   performing, by using a first machine learning model, feature extraction on the package attribute vectors respectively corresponding to the at least two virtual item packages, to obtain feature vectors respectively corresponding to the at least two virtual item packages;
   performing, by using a second machine learning model, feature extraction on the feature vectors respectively corresponding to the at least two virtual item packages and the object attribute vector of the target object, to obtain importance fractions respectively corresponding to the at least two virtual item packages; and
   extracting feature information of the target object according to the feature vectors respectively corresponding to the at least two virtual item packages and the importance fractions respectively corresponding to the at least two virtual item packages.

2. The method according to claim 1, wherein the first machine learning model is a recurrent neural network model, and the performing, by using a first machine learning model, feature extraction on the package attribute vectors respectively corresponding to the at least two virtual item packages, to obtain feature vectors respectively corresponding to the at least two virtual item packages comprises:
   sequentially inputting, in chronological order of the at least two virtual item packages, the package attribute vectors respectively corresponding to the at least two virtual item packages into the recurrent neural network model for feature extraction, to obtain the feature vectors respectively corresponding to the at least two virtual item packages.

3. The method according to claim 2, wherein the recurrent neural network model comprises a first recurrent neural network model and a second recurrent neural network model, and the sequentially inputting, in chronological order of the at least two virtual item packages, the package attribute vectors respectively corresponding to the at least two virtual item packages into the recurrent neural network model for feature extraction, to obtain the feature vectors respectively corresponding to the at least two virtual item packages comprises:
   sequentially inputting, in an order from first to last of times respectively corresponding to the at least two virtual item packages, the package attribute vectors respectively corresponding to the at least two virtual item packages into the first recurrent neural network model for feature extraction, to obtain first parts of feature vectors respectively corresponding to the at least two virtual item packages;
   sequentially inputting, in an order from last to first of the times respectively corresponding to the at least two virtual item packages, the package attribute vectors respectively corresponding to the at least two virtual item packages into the second recurrent neural network model for feature extraction, to obtain second parts of feature vectors respectively corresponding to the at least two virtual item packages; and
   for any one of the at least two virtual item packages, concatenating a first part of a feature vector of the virtual item package with a second part of the feature vector of the virtual item package, to obtain the feature vector of the virtual item package.

4. The method according to claim 2, wherein the recurrent neural network model is a long short term memory recurrent neural network model or a threshold recurrent neural network.

5. The method according to claim 1, wherein the second machine learning model is an attention mechanism model, and the performing, by using a second machine learning model, feature extraction on the feature vectors respectively corresponding to the at least two virtual item packages and the object attribute vector of the target object, to obtain importance fractions respectively corresponding to the at least two virtual item packages comprises:
   inputting the object attribute vector of the target object and the feature vectors respectively corresponding to the at least two virtual item packages into the attention mechanism model, to obtain importance values respectively corresponding to the at least two virtual item packages; and normalizing the importance values respectively corresponding to the at least two virtual item packages, to obtain the importance fractions respectively corresponding to the at least two virtual item packages.

6. The method according to claim 1, wherein the extracting feature information of the target object according to the feature vectors respectively corresponding to the at least two virtual item packages and the importance fractions respectively corresponding to the at least two virtual item packages comprises:

performing, according to the importance fractions respectively corresponding to the at least two virtual item packages, weighted summation on the feature vectors respectively corresponding to the at least two virtual item packages, and extracting a vector obtained through the weighted summation as the feature information of the target object; or sorting, in an order from high to low of the corresponding importance fractions, the feature vectors respectively corresponding to the at least two virtual item packages, and extracting an average value of the first j sorted feature vectors as the feature information of the target object, wherein $1 \leq j \leq n$, j and n are integers, and n is a quantity of the at least two virtual items.

7. The method according to claim 1, further comprising:
inputting the feature information of the target object into a machine classification model, to obtain classification information of the target object, wherein the classification information of the target object is used to indicate a classification corresponding to the target object.

8. The method according to claim 7, further comprising:
obtaining an actual classification of the target object; and
modifying the first machine learning model, the second machine learning model, and the machine classification model according to the actual classification of the target object and the classification information of the target object.

9. A feature information extraction hardware apparatus, comprising:

a first vector obtaining circuit, configured to obtain package attribute vectors respectively corresponding to at least two virtual item packages of a target object, each element in the package attribute vectors indicating one attribute of a corresponding virtual item package;

a second vector obtaining circuit, configured to obtain an object attribute vector of the target object, each element in the object attribute vector indicating one attribute of the target object;

a feature vector obtaining circuit, configured to perform, by using a first machine learning model, feature extraction on the package attribute vectors respectively corresponding to the at least two virtual item packages, to obtain feature vectors respectively corresponding to the at least two virtual item packages;

a fraction obtaining circuit, configured to perform, by using a second machine learning model, feature extraction on the feature vectors respectively corresponding to the at least two virtual item packages and the object attribute vector of the target object, to obtain importance fractions respectively corresponding to the at least two virtual item packages; and a feature extraction circuit, configured to extract feature information of the target object according to the feature vectors respectively corresponding to the at least two virtual item packages and the importance fractions respectively corresponding to the at least two virtual item packages.

10. The apparatus according to claim 9, wherein the first machine learning model is a recurrent neural network model; and the feature vector obtaining circuit is configured to sequentially input, in chronological order of the at least two virtual item packages, the package attribute vectors respectively corresponding to the at least two virtual item packages into the recurrent neural network model for feature extraction, to obtain the feature vectors respectively corresponding to the at least two virtual item packages.

11. The apparatus according to claim 10, wherein the recurrent neural network model comprises a first recurrent neural network model and a second recurrent neural network model, and the feature vector obtaining circuit comprises:

first vector obtaining circuitry, configured to sequentially input, in an order from first to last of times respectively corresponding to the at least two virtual item packages, the package attribute vectors respectively corresponding to the at least two virtual item packages into the first recurrent neural network model for feature extraction, to obtain first parts of feature vectors respectively corresponding to the at least two virtual item packages;

second vector obtaining circuitry, configured to sequentially input, in an order from last to first of the times respectively corresponding to the at least two virtual item packages, the package attribute vectors respectively corresponding to the at least two virtual item packages into the second recurrent neural network model for feature extraction, to obtain second parts of feature vectors respectively corresponding to the at least two virtual item packages; and concatenating circuitry, configured to: for any one of the at least two virtual item packages, concatenate a first part of feature vector of the virtual item package with a second part of feature vector of the virtual item package, to obtain a feature vector of the virtual item package.

12. The apparatus according to claim 10, wherein the recurrent neural network model is a long short term memory recurrent neural network model or a threshold recurrent neural network.

13. The apparatus according to claim 9, wherein the second machine learning model is an attention mechanism model, and the fraction obtaining module comprises:

value obtaining circuitry, configured to input the object attribute vector of the target object and the feature vectors respectively corresponding to the at least two virtual item packages into the attention mechanism model, to obtain importance values respectively corresponding to the at least two virtual item packages; and normalizing circuitry, configured to normalize the importance values respectively corresponding to the at least two virtual item packages, to obtain the importance fractions respectively corresponding to the at least two virtual item packages.

14. The apparatus according to claim 9, wherein the feature extraction circuit is configured to:

perform, according to the importance fractions respectively corresponding to the at least two virtual item packages, weighted summation on the feature vectors respectively corresponding to the at least two virtual item packages, and extract a vector obtained through the weighted summation as the feature information of the target object;

sort, in an order from high to low of the corresponding importance fractions, the feature vectors respectively corresponding to the at least two virtual item packages, and extract an average value of the first j sorted feature vectors as the feature information of the target object, wherein $1 \leq j \leq n$, j and n are integers, and n is a quantity of the at least two virtual items; or both of the foregoing.

15. The apparatus according to any one of claims 9 to 14, further comprising:

a classification circuit, configured to input the feature information of the target object into a machine classification model, to obtain classification information of the target object, wherein the classification information of the target object is used to indicate a classification corresponding to the target object.

16. The apparatus according to claim 15, further comprising:

a classification obtaining circuit, configured to obtain an actual classification of the target object; and a modification circuit, configured to modify the first machine learning model, the second machine learning model, and the machine classification model according to the actual classification of the target object and the classification information of the target object.

17. A non-transitory computer readable storage medium, comprising one or more instructions, when executed by a processor, the one or more instructions configured cause the processor to perform:

obtaining package attribute vectors respectively corresponding to at least two virtual item packages of a target object, and obtaining an object attribute vector of the target object, each element in the package attribute vectors indicating one attribute of a corresponding virtual item package, and each element in the object attribute vector indicating one attribute of the target object;

performing, by using a first machine learning model, feature extraction on the package attribute vectors respectively corresponding to the at least two virtual item packages, to obtain feature vectors respectively corresponding to the at least two virtual item packages;

performing, by using a second machine learning model, feature extraction on the feature vectors respectively corresponding to the at least two virtual item packages and the object attribute vector of the target object, to obtain importance fractions respectively corresponding to the at least two virtual item packages; and extracting feature information of the target object according to the feature vectors respectively corresponding to the at least two virtual item packages and the importance fractions respectively corresponding to the at least two virtual item packages.

18. The non-transitory computer readable storage medium according to claim 17, wherein the first machine learning model is a recurrent neural network model, and the performing, by using a first machine learning model, feature extraction on the package attribute vectors respectively corresponding to the at least two virtual item packages, to obtain feature vectors respectively corresponding to the at least two virtual item packages comprises:

sequentially inputting, in chronological order of the at least two virtual item packages, the package attribute vectors respectively corresponding to the at least two virtual item packages into the recurrent neural network model for feature extraction, to obtain the feature vectors respectively corresponding to the at least two virtual item packages.

19. The non-transitory computer readable storage medium according to claim 18, wherein the recurrent neural network model comprises a first recurrent neural network model and a second recurrent neural network model, and the sequentially inputting, in chronological order of the at least two virtual item packages, the package attribute vectors respectively corresponding to the at least two virtual item packages into the recurrent neural network model for feature extraction, to obtain the feature vectors respectively corresponding to the at least two virtual item packages comprises:

sequentially inputting, in an order from first to last of times respectively corresponding to the at least two virtual item packages, the package attribute vectors respectively corresponding to the at least two virtual item packages into the first recurrent neural network model for feature extraction, to obtain first parts of feature vectors respectively corresponding to the at least two virtual item packages;

sequentially inputting, in an order from last to first of the times respectively corresponding to the at least two virtual item packages, the package attribute vectors respectively corresponding to the at least two virtual item packages into the second recurrent neural network model for feature extraction, to obtain second parts of feature vectors respectively corresponding to the at least two virtual item packages; and for any one of the at least two virtual item packages, concatenating a first part of a feature vector of the virtual item package with a second part of the feature vector of the virtual item package, to obtain the feature vector of the virtual item package.

20. The non-transitory computer readable storage medium according to claim 18, wherein the recurrent neural network model is a long short term memory recurrent neural network model or a threshold recurrent neural network.

* * * * *